US008108087B2

(12) United States Patent
Stone et al.

(10) Patent No.: US 8,108,087 B2
(45) Date of Patent: Jan. 31, 2012

(54) SEQUENCING, MERGING AND APPROACH-SPACING SYSTEMS AND METHODS

(75) Inventors: Cyro A. Stone, Peoria, AZ (US);
Gregory T. Stayton, Peoria, AZ (US);
Charles C. Manberg, Peoria, AZ (US)

(73) Assignee: Aviation Communication & Surveillance Systems LLC, Phoenix, AZ (US)

( * ) Notice: Subject to any disclaimer, the term of this patent is extended or adjusted under 35 U.S.C. 154(b) by 1007 days.

(21) Appl. No.: 11/452,446

(22) Filed: Jun. 13, 2006

(65) Prior Publication Data
US 2007/0061055 A1 Mar. 15, 2007

Related U.S. Application Data

(60) Provisional application No. 60/690,191, filed on Jun. 13, 2005.

(51) Int. Cl.
B64C 13/00 (2006.01)
G08C 21/00 (2006.01)
G01C 21/00 (2006.01)
(52) U.S. Cl. ............................ 701/16; 701/120; 701/300
(58) Field of Classification Search .................. 701/2, 3, 701/16, 120, 121, 207, 301, 300; 342/29, 342/30, 36
See application file for complete search history.

(56) References Cited

U.S. PATENT DOCUMENTS

| 6,133,867 | A | 10/2000 | Eberwine et al. | |
|---|---|---|---|---|
| 6,393,358 | B1 * | 5/2002 | Erzberger et al. | 701/120 |
| 6,480,789 | B2 * | 11/2002 | Lin | 701/301 |
| 6,587,757 | B2 * | 7/2003 | Sainthuile | 701/1 |
| 6,718,236 | B1 * | 4/2004 | Hammer et al. | 701/3 |
| 7,136,011 | B2 * | 11/2006 | Mork et al. | 342/29 |
| 7,412,324 | B1 * | 8/2008 | Bagge et al. | 701/120 |
| 2001/0002817 | A1 * | 6/2001 | Berlioz et al. | 340/978 |
| 2002/0183900 | A1 * | 12/2002 | Sainthuile | 701/4 |
| 2003/0004641 | A1 * | 1/2003 | Corwin et al. | 701/301 |
| 2003/0050746 | A1 * | 3/2003 | Baiada et al. | 701/3 |
| 2003/0200024 | A1 | 10/2003 | Poreda | |
| 2006/0015247 | A1 * | 1/2006 | Speer | 701/206 |
| 2008/0103647 | A1 * | 5/2008 | Lucas et al. | 701/16 |
| 2008/0114504 | A1 * | 5/2008 | Goodman et al. | 701/3 |
| 2008/0243314 | A1 * | 10/2008 | Ridenour | 701/7 |
| 2009/0157287 | A1 * | 6/2009 | Shafaat et al. | 701/120 |
| 2010/0286848 | A1 * | 11/2010 | Stassen et al. | 701/3 |

FOREIGN PATENT DOCUMENTS

WO WO 00/41153 A1 7/2000

\* cited by examiner

*Primary Examiner* — Mark Hellner
*Assistant Examiner* — Ari M Diacou
(74) *Attorney, Agent, or Firm* — Allen J. Moss; Squire, Sanders & Dempsey L.L.P.

(57) ABSTRACT

An aircraft control system is delineated for a host aircraft, the system comprising a processor for executing one or more instructions that implement one or more functions of the aircraft control system, a transceiver for transmitting information from and receiving information for the host aircraft, and memory for storing the one or more instructions for execution by the processor to implement the one or more functions of the aircraft control system to: receive from the transceiver information from another aircraft, and generate from the received information a signal for use in the host aircraft to control separation between the host aircraft and the other aircraft while the aircraft are within a predefined range of a location where the aircraft plan to land.

22 Claims, 2 Drawing Sheets

SEQUENCING, MERGING AND APPROACH-SPACING SYSTEMS AND METHODS

CROSS REFERENCE TO RELATED APPLICATIONS

This application is related to and claims priority from U.S. application No. 60/690,191, filed Jun. 13, 2005, in the name of the same inventors and having the same title, all of which is incorporated herein by reference.

DESCRIPTION OF THE INVENTION

1. Field of the Invention

The present invention relates to aircraft control systems and methods, and more particularly, to aircraft control systems and methods that enable more efficient aircraft approach and landing procedures.

2. Background of the Invention

Air traffic controller workload in areas of high traffic density airspace currently results in unnecessarily large spacing to maintain safe separation spacing and flow of traffic within the terminal airspace on the approaches to a runway. This unnecessarily large spacing negatively affects the efficiency and capacity of high traffic density airspace. As used herein, the phrase "terminal airspace" refers to airspace at any altitude within a predefined range, e.g., 50 miles, of any location where aircraft land, e.g., an airport.

Thus, a need exists for aircraft control systems and methods, which overcome these and other problems.

SUMMARY OF THE INVENTION

In accordance with an embodiment of the invention, an aircraft control system is disclosed for a host aircraft, the system comprising a processor for executing one or more instructions that implement one or more functions of the aircraft control system, a transceiver for transmitting information from and receiving information for the host aircraft, and memory for storing the one or more instructions for execution by the processor to implement the one or more functions of the aircraft control system to: receive from the transceiver information from another aircraft, and generate from the received information a signal for use in the host aircraft to control separation between the host aircraft and the other aircraft while the aircraft are within a predefined range of a location where the aircraft plan to land.

In this embodiment of the invention, the information received from the other aircraft may comprise one or more of position data and velocity data of the other aircraft. The information received from the other aircraft may also or alternatively comprise Automatic Dependant Surveillance—Broadcast (ADS-B) aircraft state data for the other aircraft. The generation of the signal may also be based on aircraft state data for the host aircraft. Aircraft state data for the host aircraft may comprise one or more of position data and velocity data of the host aircraft. The signal may be used to generate a command for use by the host aircraft to control separation between the host aircraft and the other aircraft. The separation may comprise a range between the host aircraft and the other aircraft. Alternatively, the separation may comprise a time until a range between the host aircraft and the other aircraft is closed to a predefined limit at a specified rate of closure. The command may comprise a speed command for use by the host aircraft to control separation between the host aircraft and the other aircraft. The speed command may be employed by one of a manual speed adjustment and an automatic speed adjustment. The transceiver may comprise a separate receiver and a separate transmitter.

In accordance with another embodiment of the invention, a method is disclosed for operating an aircraft control system for a host aircraft, the method comprising receiving on the host aircraft information from another aircraft, and generating from the received information a signal for use in the host aircraft to control separation between the host aircraft and the other aircraft while the aircraft are within a predefined range of a location where the aircraft plan to land.

In this embodiment of the invention, the information received from the other aircraft may comprise one or more of position data and velocity data of the other aircraft. The information received from the other aircraft may also or alternatively comprise Automatic Dependant Surveillance—Broadcast (ADS-B) aircraft state data for the other aircraft. The generation of the signal may also be based on aircraft state data for the host aircraft. Aircraft state data for the host aircraft may comprise one or more of position data and velocity data of the host aircraft. The signal may be used to generate a command for use by the host aircraft to control separation between the host aircraft and the other aircraft. The separation may comprise a range between the host aircraft and the other aircraft. Alternatively, the separation may comprise a time until a range between the host aircraft and the other aircraft is closed to a predefined limit at a specified rate of closure. The command may comprise a speed command for use by the host aircraft to control separation between the host aircraft and the other aircraft. The speed command may be employed by one of a manual speed adjustment and an automatic speed adjustment. The transceiver may comprise a separate receiver and a separate transmitter.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Figure 1:
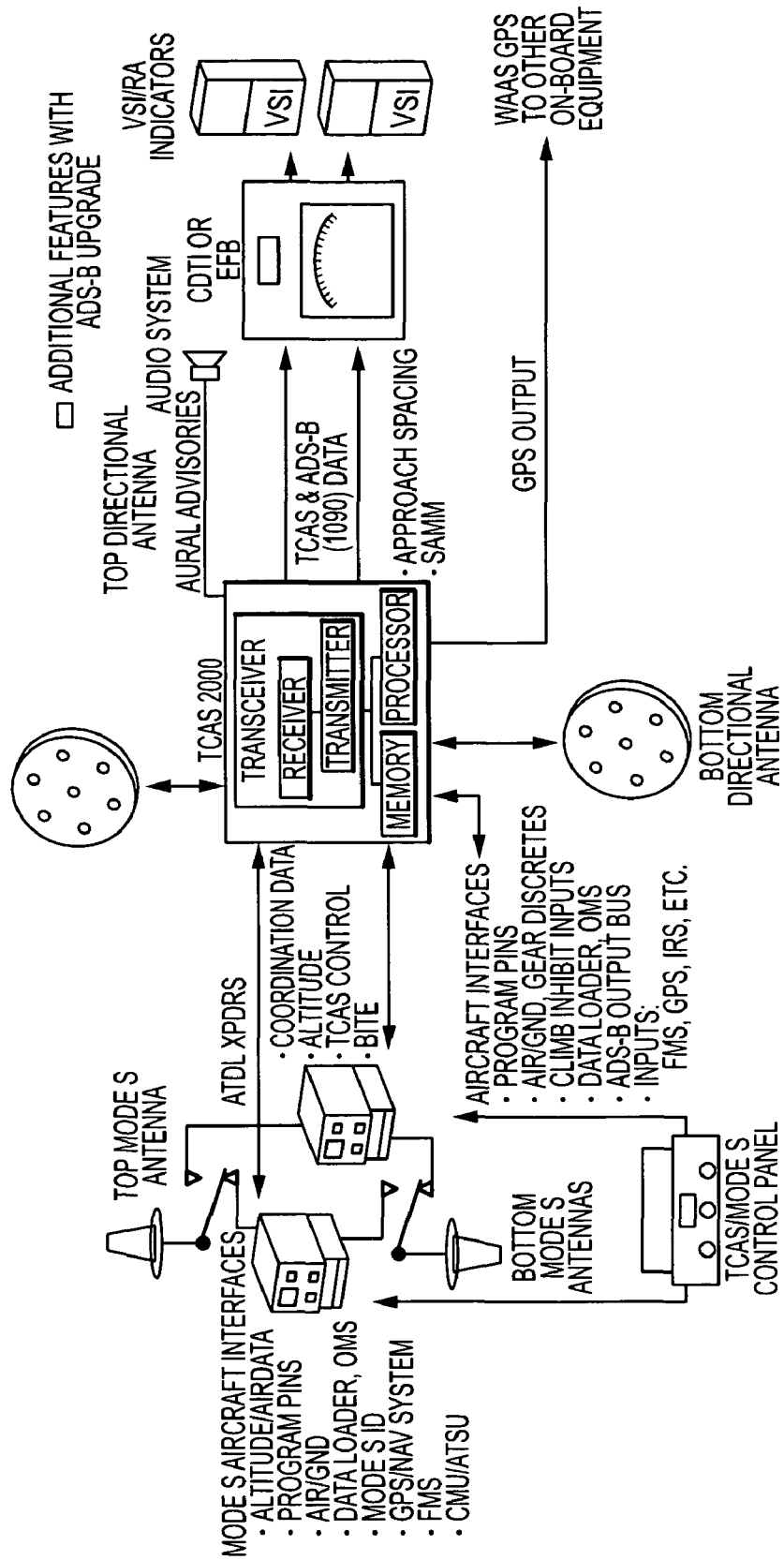
FIG. 1 is a system diagram showing elements of an aircraft control system that may be employed, in accordance with systems and methods consistent with the present invention.

Reference will now be made in detail to the present exemplary embodiments of the invention, examples of which are illustrated in the accompanying drawings. Wherever possible, the same reference numbers will be used throughout the drawings to refer to the same or like parts.

A sequencing, merging and approach-spacing system (hereinafter "System") may address such problems. The System may utilize on-board aircraft surveillance and Cockpit Display of Traffic Information (CDTI) technology to safely reduce the excess spacing buffers currently used by air traffic controllers when separating aircraft that are maneuvering through the terminal area and arriving at the runway threshold. The System may provide more consistent aircraft spacing that may increase the capacity and efficiency with which aircraft are processed within terminal airspace. To optimize the benefits that the System offers, changes to existing air traffic control procedures may be required.

The System may provide a speed command to the flight deck that allows the flight crew to adjust the speed of their aircraft in order to maintain a specified spacing interval to a specified target aircraft. Automatic Dependant Surveillance—Broadcast (ADS-B) aircraft state data of a selected target aircraft may be used to compute a speed command for the required interval spacing behind the selected target aircraft. The speed command may be displayed on a CDTI display in the aircraft in any suitable manner. For example, the speed command may be displayed in the form of a speed bug indicating whether the aircraft is under/over/at the specified aircraft speed to maintain the specified spacing.

Air traffic control may provide any data desired for use by the System. For example, air traffic control may provide the system with: (1) target aircraft flight identification; (2) initiation of the sequence and merge procedure; and (3) a spacing interval to a target aircraft.

The sequence and merge procedure may provide appropriate aircraft maneuvers to obtain the specified spacing. Four exemplary types of sequence and merge procedures include: (1) remain behind; (2) merge behind; (3) radar vector then remain behind; and (4) radar vector then merge behind.

The radar vector procedure ('dog-leg') may be specified by air traffic control when speed changes do not provide the specified spacing.

The system may use the above-identified input data along with the target aircraft's ADS-B aircraft state data, e.g., position and velocity, and own aircraft's position and velocity data to calculate the speed to maintain the specified spacing interval. When a merging procedure is specified, radar vector along with waypoint/trajectory change point (TCP) data from own aircraft/ADS-B aircraft state data may be used to compute the speed to merge at a defined waypoint. Aircraft roll may be used to dynamically update the speed and Initiate-Turn-Command when the aircraft is turning towards the waypoint at the start of the second leg of a 'dog leg'. A calculated bank angle may be used when initially calculating the interval to the merge waypoint. The Initiate-Turn-Command indication, which may be based on the spacing calculation, may be provided on the CDTI display to indicate to the flight crew when to begin turning back towards the merge waypoint. Also, the desired calculated bank angle that may be used in the spacing calculation may be provided to the CDTI for display. This bank indicator may be a symbol-type indication on the display. The flight crew can perform the transition to the second leg of the 'dog leg' using the desired displayed bank angle.

If the aircraft is unable to obtain the specified spacing interval within practical limits, the System may provide an indication on the CDTI display that the specified procedure and spacing interval cannot be met.

The CDTI may be used for both entry and display of data. Display bezel pushbuttons and rotary knobs are possible solutions to provide data entry/selection by the CDTI. The following data may be entered/selected for the application with the CDTI: (1) select target aircraft data list based on flight identification; (2) select sequence and merge procedure (e.g., select from a menu); and (3) input spacing interval (e.g. select from a menu or in 0.1 NM spacing resolution increments provided by a slow/fast selection rate using key depress time or other suitable means). Other data may be entered/selected by the CDTI.

The CDTI may display any desired data for the application, including: (1) own aircraft position; (2) TCAS basic traffic; (3) ADS-B/TIS-B traffic; (4) merge waypoint; (5) current calculated spacing interval; (6) speed command (bug): (7) distance to selected target; (8) selected sequence and merge procedure; (9) specified procedure and spacing interval cannot be met indication; (10) Initiate-Turn-Command indication for second leg of radar vector procedure; and (11) desired bank angle indication for transition to second leg of radar vector procedure.

Own aircraft and traffic information may be provided to the CDTI. Entry/selection data may be transmitted from the CDTI to one or more processes that may employ the same, e.g., the process depicted in FIG. 2.

The block diagram shown below in FIG. 1 provides a possible hardware architecture that may be used to embody aspects of the invention. Mode S transponders can be used between some or all vehicles to send messages about the position of own aircraft to other aircraft. These messages can then be received by the TCAS computer unit, and processed to provide a display to the flight crew of the vehicles nearby or within a predefined range.

Figure 2:
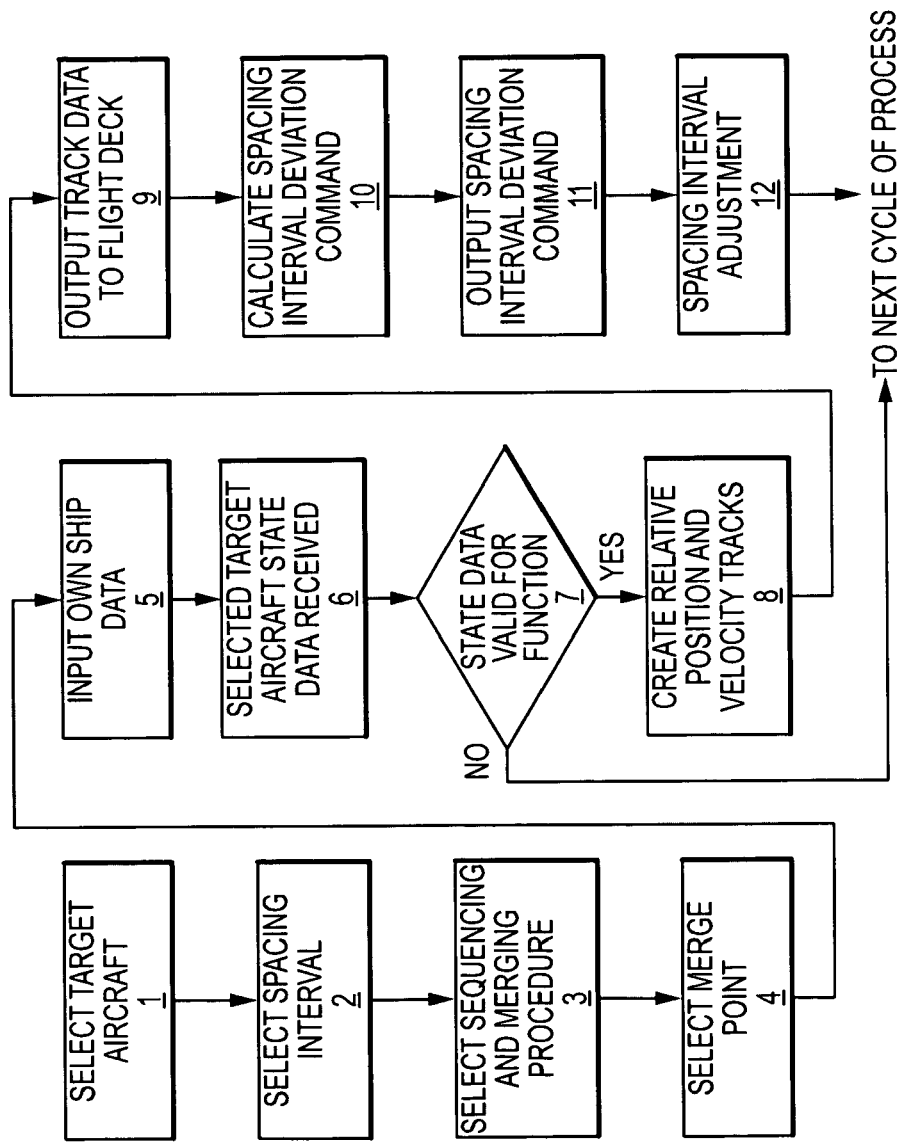
FIG. 2 is a flowchart diagram showing a process that may be employed in an aircraft control system, in accordance with systems and methods consistent with the present invention

FIG. 2 depicts a process that may be performed by the System of FIG. 1; however, those skilled in the art understand that variations to the System may be made while still employing the process of FIG. 2. Software to perform the process of FIG. 2 may be stored in memory anywhere in the System and executed by one or more processors.

In step 1, the System may identify the selected target aircraft by which a desired spacing interval may be established to allow more closely spaced approaches along the approach path to an airport runway. The selected target aircraft may be identified by its flight identification that could be the airline flight number (airline +flight number) or the aircraft registration number. The selected target aircraft may generally be specified by air traffic control (ATC) and communicated to the flight deck either via ATC voice communications, via a data link, such as controller/pilot data link control (CPDLC), or other means of air traffic control communication. Means for inputting the selected target aircraft can be provided by selecting the target aircraft from the ADS-B traffic that may be displayed on the flight deck display or the selected target aircraft identification is input on a flight deck display or controller.

In step 2, the System may identify a specified spacing interval to be maintained between the selected target aircraft and the aircraft that is maintaining the spacing (identified here as the own aircraft) to the selected target aircraft as the aircraft merge and maintain spacing along the approach path the airport runway. The specified spacing interval may generally be a time or distance spacing interval. The specified spacing interval may generally be selected by air traffic control and communicated to the flight deck either via ATC voice communications, via a data link, such as controller/pilot data link control (CPDLC), or other means of air traffic control communication. Means for inputting the specified spacing interval can be provided on a flight deck display or controller.

In step 3, the System may identify a specified aircraft maneuver or procedure to perform to sequence and merge the aircraft with the selected target aircraft into a single stream of aircraft that are approaching an airport runway. This could comprise procedures such as merge behind the selected target aircraft, remain behind the selected target aircraft, or a radar vector to allow the aircraft to slow down before merging behind the selected target aircraft. The selected sequencing and merging procedure may generally be specified by air traffic control and communicated to the flight deck either via ATC voice communications, via a data link such as controller/pilot data link control (CPDLC), or other means of air traffic control communications. Means for inputting the selected sequencing and merging procedure can be provided on a flight deck display or controller.

In step 4, the System may identify a position point along the approach path to the airport runway that may be used as a specified point to allow the merging of aircraft into a single stream of aircraft that may approach an airport runway. Additionally, the position point may be employed to service multiple aircraft streams or multiple position points may be employed to serve multiple aircraft streams. The selected merge point may generally be a position point identified in a published standard terminal arrival route (STAR). The selected merge point may generally be specified by air traffic control and communicated to the flight deck either via ATC voice communications, via a data link, such as controller/pilot data link control (CPDLC), or other means of air traffic control communications. Means for inputting the selected position point can be provided on a flight deck display or controller.

In step 5, the System may input own aircraft data. Own aircraft data may be data from the aircraft that may be used to calculate and maintain the specified interval to a selected target aircraft. This data may generally be aircraft position and velocity data that may be used to calculate the spacing interval to the selected target aircraft. This data may be provided from aircraft sensor systems onboard the aircraft.

In step 6, the System may receive selected target aircraft state data. This data may include data concerning the position and velocity of the selected target aircraft that may be used for identifying the aircraft and calculating the spacing interval. For example, this data may include but is not limited to position, velocity, flight identification, altitude, on ground or airborne status, aircraft type and the like. This data may generally be transmitted via data communications link, such as links that provide this data utilizing Automatic Dependant Surveillance Broadcast (ADS-B) technology.

In step 7, the System may make a determination as to the validity of the received data. For example, the System may evaluate the reasonableness of the data, i.e., is all the data consistent for each scan under normal conditions. Such reasonableness determinations may involve any received data, such as instantaneous acceleration, velocity, update rates and minimum/maximum values. A validity determination may also include an integrity check of any of the received data, i.e., checking that the data is accurate and believable, according to predetermined standards. A validity determination may also verify that data update rates are appropriate under the circumstances, so, for example, data is not too old for a given set of conditions. A validity determination may also verify that data is complete. Data passing selected validity tests may be employed by subsequent steps in the process, however, invalid data is not so used and the process may return to step 1.

In step 8, the System may create relative position and velocity tracks. For example, the System may take own aircraft's position and velocity data and compare this to the selected aircraft's position and velocity data (and, if desired, data for other aircraft) to determine relative ranges, bearings, and altitudes to provide indications to the flight crew of where the selected target aircraft (and, if desired, other aircraft) is relative to own aircraft, which can be used to establish tracks for situational awareness purposes. Such processing may employ any suitable algorithm, e.g., a haversine formula or, for close ranges, a latitude/longitude subtraction between own aircraft and the selected target aircraft (and, if desired, other aircraft) to determine the relative position between own aircraft and the selected target/other aircraft.

In step 9, the System may provide outputs to any annunciating or display device within the flight deck that can provide situational awareness of the selected target aircraft and own aircraft to the flight crew.

In step 10, the System may calculate a command to the flight deck that may provide an indication to the flight crew of the difference in the currently calculated spacing interval to the specified spacing interval provided to the flight deck, as defined in step 2. The current spacing interval may be calculated using own aircraft position and velocity from step 5 and the selected target aircraft position and velocity track data from step 8. The spacing interval deviation command can take the form of an aircraft speed command that the flight crew can use to make adjustments to the aircraft speed to obtain and maintain the required spacing. The spacing interval deviation command may be automatically employed, if desired. Also, the spacing interval deviation command could be a displayed position marker on the flight deck display that may indicate where own aircraft position should be relative to the selected target aircraft, so that the flight crew can maneuver the aircraft to place the aircraft at this position marker on the display.

In step 11, the System may provide an output of the spacing interval deviation command described in step 10 to the flight deck.

In step 12, adjustment of own aircraft flight parameters may be employed to obtain or maintain the specified spacing interval with the selected target aircraft. This may be performed by the flight crew by manually adjusting the speed of the aircraft (or other control parameter) by following the spacing interval deviation command, as defined in step 10 or providing an automatic speed (or other parameter) control by providing a spacing interval deviation command to an automatic aircraft speed (or other parameter) control computer.

While the System has been described for use in the context of an air terminal, the System may similarly be employed outside this context, e.g., to control spacing between aircraft in any situation.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An aircraft control system for a host aircraft, the system comprising:
 a processor for executing one or more instructions that implement one or more functions of the aircraft control system;
 a transceiver for transmitting information from and receiving information for the host aircraft;
 a display; and
 memory for storing the one or more instructions for execution by the processor to implement the one or more functions of the aircraft control system to:
  receive from the transceiver information from another aircraft;
  determine whether the host aircraft and the other aircraft are within a predefined range of a location where the host aircraft and the other aircraft plan to land; and
  when the host aircraft and the other aircraft are within the predefined range of the location where the host aircraft and the other aircraft plan to land, generate from the received information a signal for use in the host aircraft to control separation between the host aircraft and the other aircraft while the host aircraft and the other aircraft are within the predefined range of the location where the host aircraft and the other aircraft plan to land, wherein controlling the separation between the host aircraft and the other aircraft includes maintaining a spacing interval between the host aircraft and the other aircraft and wherein the signal is used to indicate on the display a position of where the host aircraft should be relative to the other aircraft to control separation between the host aircraft and the other aircraft.

2. The aircraft control system of claim 1 wherein the information received from the other aircraft comprises one or more of position data and velocity data of the other aircraft.

3. The aircraft control system of claim 1 wherein the information received from the other aircraft comprises Automatic Dependant Surveillance—Broadcast (ADS-B) aircraft state data for the other aircraft.

4. The aircraft control system of claim 1 wherein the generation of the signal is also based on aircraft state data for the host aircraft.

5. The aircraft control system of claim 4 wherein the aircraft state data for the host aircraft comprises one or more of position data and velocity data of the host aircraft.

6. The aircraft control system of claim 1 wherein the signal is used to generate a command for use by the host aircraft to control separation between the host aircraft and the other aircraft.

7. The aircraft control system of claim 1 wherein the separation comprises a range between the host aircraft and the other aircraft.

8. The aircraft control system of claim 1 wherein the separation comprises a time until a range between the host aircraft and the other aircraft is closed to a predefined limit at a specified rate of closure.

9. The aircraft control system of claim 6 wherein the command comprises a speed command for use by the host aircraft to control separation between the host aircraft and the other aircraft.

10. The aircraft control system of claim 9 wherein the speed command is employed by one of a manual speed adjustment and an automatic speed adjustment.

11. The aircraft control system of claim 1 wherein the transceiver comprises a separate receiver and a separate transmitter.

12. A method of operating an aircraft control system for a host aircraft, the method comprising:
receiving on the host aircraft information from another aircraft;
determining whether the host aircraft and the other aircraft are within a predefined range of a location where the host aircraft and the other aircraft plan to land; and
when the host aircraft and the other aircraft are within the predefined range of the location where the host aircraft and the other aircraft plan to land, generating from the received information a signal for use in the host aircraft to control separation between the host aircraft and the other aircraft while the aircraft are within the predefined range of the location where the host aircraft and the other aircraft plan to land, wherein controlling the separation between the host aircraft and the other aircraft includes maintaining a spacing interval between the host aircraft and the other aircraft and wherein the signal is used to indicate on the display a position of where the host aircraft should be relative to the other aircraft to control separation between the host aircraft and the other aircraft.

13. The method of claim 12 wherein the information received from the other aircraft comprises one or more of position data and velocity data of the other aircraft.

14. The method of claim 12 wherein the information received from the other aircraft comprises Automatic Dependant Surveillance—Broadcast (ADS-B) aircraft state data for the other aircraft.

15. The method of claim 12 wherein the generation of the signal is also based on aircraft state data for the host aircraft.

16. The method of claim 15 wherein the aircraft state data for the host aircraft comprises one or more of position data and velocity data of the host aircraft.

17. The method of claim 12 wherein the signal is used to generate a command for use by the host aircraft to control separation between the host aircraft and the other aircraft.

18. The method of claim 12 wherein the separation comprises a range between the host aircraft and the other aircraft.

19. The method of claim 12 wherein the separation comprises a time until a range between the host aircraft and the other aircraft is closed to a predefined limit at a specified rate of closure.

20. The method of claim 17 wherein the command comprises a speed command for use by the host aircraft to control separation between the host aircraft and the other aircraft.

21. The method of claim 20 wherein the speed command is employed by one of a manual speed adjustment and an automatic speed adjustment.

22. The method of claim 12 further comprising a transceiver for transmitting information from and receiving information for the host aircraft, wherein the transceiver comprises a separate receiver and a separate transmitter.

* * * * *